United States Patent [19]

Narula et al.

[11] Patent Number: 5,205,860
[45] Date of Patent: Apr. 27, 1993

[54] WATER REPELLENTS CONTAINING ORGANOSILICON COMPOUNDS

[75] Inventors: Dipak Narula; Lori A. Stark, both of Midland, Mich.

[73] Assignee: Dow Corning Corporation, Midland, Mich.

[21] Appl. No.: 824,272

[22] Filed: Jan. 23, 1992

[51] Int. Cl.$^5$ .................... B05D 3/02; C08F 283/16
[52] U.S. Cl. .................... 106/2; 106/287.11; 106/287.13; 106/287.16; 106/287.18; 524/858; 524/869; 528/12; 528/18; 528/20; 528/22; 529/29; 529/38; 529/39; 427/387; 428/446; 428/447; 428/688; 428/702; 428/703
[58] Field of Search .................. 106/2, 287.11, 287.16, 106/287.13, 287.19; 524/858, 869; 528/12, 18, 20, 22, 29, 38, 39; 556/410, 413, 446, 465; 427/387; 428/446, 447, 688, 702, 703

[56] References Cited

U.S. PATENT DOCUMENTS

| | | | |
|---|---|---|---|
| 4,227,929 | 10/1988 | Law et al. | 106/287.16 |
| 4,273,813 | 6/1981 | Meddaugh | 427/387 |
| 4,999,249 | 3/1991 | Deschler et al. | 106/2 |
| 5,051,129 | 9/1991 | Cuthbert | 106/2 |

Primary Examiner—Mark L. Bell
Assistant Examiner—C. M. Bonner
Attorney, Agent, or Firm—Jim L. DeCesare

[57] ABSTRACT

A surface treating composition for excluding water penetration which is a solution obtained by combining water; an alkyltrialkoxysilane selected from the group consisting of $C_1$ to $C_6$ alkyl groups on silicon and blends of alkyltrialkoxysilanes with $C_1$ to $C_6$ alkyl groups on silicon; a silane coupling agent; and an aqueous silicone emulsion of an anionically stabilized hydroxyl end-blocked polydiorganosiloxane, amorphous silica and an organic tin salt.

20 Claims, No Drawings

WATER REPELLENTS CONTAINING ORGANOSILICON COMPOUNDS

BACKGROUND OF THE INVENTION

This invention relates to compositions for rendering surfaces water repellent, and more particularly is directed to aqueous compositions containing certain organosilicon compounds.

The treatment of surfaces such as masonry with compositions containing organosilicon compounds is old in the art. U.S. Pat. No. 5,051,129 issued Sep. 24, 1991 for example teaches that a wide variety of masonry products can be protected from the damaging effects of water penetration by the application of an aqueous solution containing the product obtained by combining water with an alkyltrialkoxysilane such as methyltrimethoxysilane and a water soluble silane coupling agent such as N-(2-aminoethyl)-3-aminopropyltrimethoxysilane.

In U.S. Pat. No. 4,273,813 issued Jun. 16, 1981 masonry surfaces are treated by the application of a silicone emulsion that cures to an elastomeric film on drying. The silicone emulsion contains an anionically stabilized hydroxyl endblocked polydiorganosiloxane, amorphous silica and an organic tin salt.

The present invention is an improvement over both of the '129 patent and the '813 patent, and provides a surface treating composition in the form of an aqueous solution formed by combining the treating materials taught in each of these patents. Thus, it has been discovered that a synergy exists in employing the combination of the two treatments, and that the combination exhibits improved water exclusion results than is obtainable when either treatment is used individually.

SUMMARY OF THE INVENTION

The invention is directed to a composition for excluding water from penetrating a surface. The composition is a solution obtained by combining water, an alkyltrialkoxysilane, a water soluble silane coupling agent or hydrolysis product thereof, and an aqueous silicone emulsion.

The invention is further directed to a method of treating surfaces for the purpose of excluding water penetration of the treated surface by applying to the surface to be treated a composition which is a solution obtained by combining water, an alkyltrialkoxysilane, a water soluble silane coupling agent or hydrolysis product thereof, and an aqueous silicone emulsion.

It is an object of the present invention to provide a surface treating composition and method of surface treatment which exhibits improved water exclusion in comparison to prior art techniques.

It is also an object of the present invention to provide a surface treating composition and method of treating surfaces which exhibit a synergy in comparison to prior art techniques when employed individually.

These and other features and advantages of the herein described present invention will become more apparent when considered in light of the following detailed description thereof.

DETAILED DESCRIPTION OF THE INVENTION

The surface treating composition according to the present invention is a solution obtained by combining (i) water; (ii) an alkyltrialkoxysilane selected from the group consisting of $C_1$ to $C_6$ alkyl groups on silicon and blends of alkyltrialkoxysilanes with $C_1$ to $C_6$ alkyl groups on silicon; (iii) a water soluble silane coupling agent or hydrolysis product thereof; and (iv) an aqueous silicone emulsion of an anionically stabilized hydroxyl endblocked polydiorganosiloxane, amorphous silica, and an organic tin salt.

Alkyltrialkoxysilanes suitable for use in the compositions in accordance with the present invention are (i) an alkyltrialkoxysilane having $C_1$ to $C_6$ alkyl groups on silicon or (ii) a blend of alkyltrialkoxysilanes each having $C_1$ to $C_6$ alkyl groups on silicon. Such silanes are well known in the art and are commercially available materials. Representative examples of such silanes are methyltrimethoxysilane, ethyltrimethoxysilane, propyltrimethoxysilane, isopropyltrimethoxysilane, butyltrimethoxysilane, isobutyltrimethoxysilane, pentyltrimethoxysilane and hexyltrimethoxysilane. The corresponding alkyltriethoxysilanes may also be employed. Methyltrimethoxysilane and isobutyltrimethoxysilane are the most preferred alyltrialkoxysilanes for use in the present invention.

Organosilane coupling agents are known in the art as evidenced by U.S. Pat. No. 4,689,085 issued Aug. 25, 1987. Silane coupling agents have the structure $X_3Si(CH_2)_nY$ in which n has a value of from zero to three; X is a hydrolyzable group on silicon; and Y is a reactive organofunctional group. Examples of some known commercial silane coupling agents suitable for use as an ingredient of the surface treating compositions in accordance with the present invention are N-(2-aminoethyl)-3-aminopropyltrimethoxy silane; N-(aminoethylaminomethyl)phenyltrimethoxy silane; N-(2-aminoethyl)-3-aminopropyltris(2-ethylhexoxy) silane; 3-aminopropyltrimethoxysilane; trimethoxysilylpropyldiethylenetriamine; phosphonate silanes and their salts such as propylmethylmethylphosphinatetrimethoxysilane and its salt sodium (trihydroxysilyl) propylmethylphosphonate; and bis(2-hydroxyethyl)-3-aminopropyltrimethoxysilane. The silane coupling agent most preferred for use in the present invention is N-(2-aminoethyl)-3-aminopropyltrimethoxy silane.

The silane coupling agents employed in accordance with the present invention should be highly water soluble silane coupling agents or hydrolyzed aqueous solutions thereof. Quaternary ammonium functional silanes may also be employed as the silane coupling agent in the compositions of the present invention. Typically, these quaternary ammonium functional silane coupling agents have a formula selected from the group consisting of

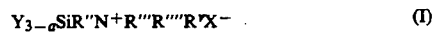

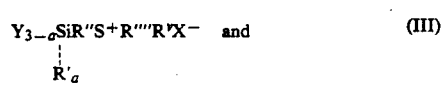

wherein in each formula (I)–(IV):

Y is R or RO where R is an alkyl radical of one to four carbon atoms or hydrogen;

a has a value of zero, one or two;

R' is a methyl or ethyl radical;

R'' is an alkylene group of one to four carbon atoms;

R''', R'''' and R$^v$ are each independently selected from the group consisting of alkyl radicals of one to eighteen carbon atoms, —CH$_2$C$_6$H$_5$, —CH$_2$CH$_2$OH, —CH$_2$OH, and —(CH$_2$)$_x$NHC(O)R$^{vi}$ wherein x has a value of from two to ten and R$^{vi}$ is a perfluoroalkyl radical having from one to twelve carbon atoms;

X is chloride, bromide, fluoride, iodide, acetate or tosylate; and

Z is a positively charged aromatic pyridinium ring of the formula C$_5$H$_6$N$^+$—.

These compounds are well known in the art and are shown in numerous domestic and foreign patents assigned to the Dow Corning Corporation, Midland Mich. USA among which are U.S. Pat. Nos. 4,847,088; 4,865,844; 4,908,355; 4,921,701; 4,985,023; 4,990,338; 5,013,459; 5,019,173; 5,061,487; 5,064,613; and European published Application 355765. The positively charged aromatic pyridinium ring C$_5$H$_6$N$^+$— shown as Z in formula (IV) above is shown structurally in each of those patents.

R in the above formulas are alkyl groups of one to four carbon atoms. Thus, useful as R in this invention are methyl, ethyl, propyl, and butyl radicals. Y can also be RO in which R is an alkyl group as noted or hydrogen indicating the silanol form, i.e. the hydrolyzate. The value of a is zero, one or two, and R' is a methyl or ethyl radical. Because of the presence of these alkyl radicals, these materials must be stabilized with a solvent. Thus, methoxy groups require methanol and ethoxy groups require ethanol.

R'' for purposes of the present invention is an alkylene group of one to four carbon atoms. Thus, R'' can be alkylene groups such as methylene, ethylene, propylene, and butylene. R''', R'''' and R$^v$ are each independently an alkyl radical of one to eighteen carbon atoms, —CH$_2$C$_6$H$_5$, —CH$_2$CH$_2$OH, —CH$_2$OH, or —(CH$_2$)$_x$NHC(O)R$^{vi}$. x has a value of from two to ten and R$^{vi}$ is a perfluoroalkyl radical having from one to twelve carbon atoms. X is chloride, bromide, fluoride, iodide, acetate or tosylate. Z is a positively charged aromatic pyridinium ring of the formula C$_5$H$_6$N$^+$—.

Preferred for this invention are the quaternary ammonium organosilanes of the formula

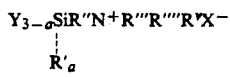

in which R is methyl or ethyl; a has a value of zero; R'' is propylene; R''' is methyl or ethyl; R'''' and R$^v$ are alkyl groups containing one to eighteen carbon atoms wherein at least one such group is larger than eight carbon atoms; and X is either chloride, acetate or tosylate.

Specific quaternary ammonium organosilanes within the scope of the present invention are represented by the formulas:

(CH$_3$O)$_3$Si(CH$_2$)$_3$N$^+$(CH$_3$)$_2$C$_{18}$H$_{37}$Cl$^-$
(CH$_3$O)$_3$Si(CH$_2$)$_3$N$^+$(CH$_3$)$_2$C$_{18}$H$_{37}$Br$^-$
(CH$_3$O)$_3$Si(CH$_2$)$_3$N$^+$(C$_{10}$H$_{21}$)$_2$CH$_3$Cl$^-$
(CH$_3$O)$_3$Si(CH$_2$)$_3$N$^+$(C$_{10}$H$_{21}$)$_2$CH$_3$Br$^-$
(CH$_3$O)$_3$Si(CH$_2$)$_3$N$^+$(CH$_3$)$_3$Cl$^-$
(CH$_3$O)$_3$Si(CH$_2$)$_3$P$^+$(C$_6$H$_5$)$_3$Cl$^-$
(CH$_3$O)$_3$Si(CH$_2$)$_3$P$^+$(C$_6$H$_5$)$_3$Br$^-$
(CH$_3$O)$_3$Si(CH$_2$)$_3$P$^+$(CH$_3$)$_3$Cl$^-$
(CH$_3$O)$_3$Si(CH$_2$)$_3$P$^+$(C$_6$H$_{13}$)$_3$Cl$^-$
(CH$_3$O)$_3$Si(CH$_2$)$_3$N$^+$(CH$_3$)$_2$C$_4$H$_9$Cl$^-$
(CH$_3$O)$_3$Si(CH$_2$)$_3$N$^+$(CH$_3$)$_2$CH$_2$C$_6$H$_5$Cl$^-$
(CH$_3$O)$_3$Si(CH$_2$)$_3$N$^+$(CH$_3$)$_2$CH$_2$CH$_2$OHCl$^-$
(CH$_3$O)$_3$Si(CH$_2$)$_3$N$^+$(C$_2$H$_5$)$_3$Cl$^-$
(CH$_3$)$_3$Si(CH$_2$)$_3$N$^+$(CH$_3$)$_2$C$_{12}$H$_{25}$Cl$^-$
(CH$_3$)$_3$Si(CH$_2$)$_3$N$^+$(C$_{10}$H$_{21}$)$_2$CH$_3$Cl$^-$
(CH$_3$)$_3$Si(CH$_2$)$_3$N$^+$(CH$_3$)$_2$C$_{18}$H$_{37}$Cl$^-$
(CH$_3$O)$_3$Si(CH$_2$)$_3$C$_5$H$_6$N$^+$Cl$^-$
(HO)$_3$Si(CH$_2$)$_3$C$_5$H$_6$N$^+$Cl$^-$
(C$_2$H$_5$O)$_3$Si(CH$_2$)$_3$N$^+$(CH$_3$)$_2$C$_{18}$H$_{37}$Cl$^-$
(CH$_3$O)$_3$Si(CH$_2$)$_3$N$^+$(CH$_3$)$_2$(CH$_2$)$_3$NH-C(O)(CF$_2$)$_6$CF$_3$Cl$^-$

One of the most preferred species of quaternary ammonium compounds corresponding to formula (I) is 3-(trimethoxysilyl)propyldimethyloctadecyl ammonium chloride of the formula:

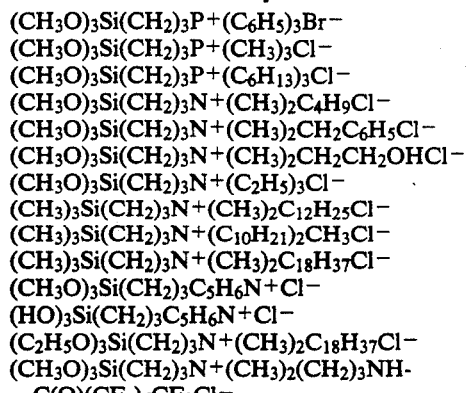

The aqueous silicone emulsion employed in the present invention is a material which dries to produce an elastomeric film. The emulsion includes an anionically stabilized hydroxyl endblocked polydiorganosiloxane, amorphous silica and an organic tin salt. The emulsion has a pH of at least nine and a solids content of 35-75 percent by weight. The emulsion includes 2-50 parts by weight of silica based on one hundred parts by weight of hydroxyl endblocked polydiorganosiloxane, 0.1-1.5 parts by weight of organic tin salt based on one hundred parts by weight of hydroxyl endblocked polydiorganosiloxane.

The emulsion and its use on masonry is described in U.S. Pat. No. 4,273,813 issued June 16, 1981. Methods of preparing the emulsion are also taught in the '813 patent. In addition, silicone emulsions which provide an elastomeric product and methods of preparing such emulsions are set forth in detail in U.S. Pat. No. 4,221,688 issued Sep. 9, 1980. Both the U.S. Pat. Nos. 4,221,688 and 4,273,813 are incorporated herein by reference. The elastomeric silicone emulsion employed in the examples hereinbelow is an emulsion having a composition corresponding to the emulsion of the U.S. Pat. No. 4,273,813 in the single example thereof.

The composition in accordance with the present invention can be employed in the treatment of various surfaces encompassing concrete and masonry products, textiles, paper, paperboard, leather products, and cellulosic materials. Examples of leather products are garments, shoes and boots. Textiles include awnings, tents, tarpaulins, rainwear, covers, slickers, canvas, asbestos, fiberglass, natural fibers, peat moss, natural and synthetic yarns, woven and nonwoven materials, carpets and carpet fibers. Cellulosic materials contemplated herein for treatment include wood, wood products, fiberboard, cedar, redwood, firs, plywood, and structural timbers. Concrete and masonry surfaces which may be treated include products and surfaces of heavy and light weight concrete, gypsum, concrete blocks, cinder blocks, soft mud bricks, sand lime bricks, drain tiles, ceramic tiles, sandstone, plaster, clay bricks, natural stones and rocks, roofing tiles, calcium silicate bricks, asbestos cement, slag stones and bricks, stucco, limestone, macadam, marble, grout, mortar, terrazzo, clinker, pumice, terra cotta, porcelain, adobe, coral, dolomite and asphalt. Noncementitious surfaces may be treated with the compositions of the present invention including perlite, cellular glass, vermiculite, mica and diatomaceous earth. Representative of such materials in the examples set forth below are (i) a neutral cementitious sandstone; (ii) a basic cementitious material which was grout; and (iii) a cellulosic material which was wood in the form of pine, redwood and cedar.

The compositions in accordance with the present invention are formulated as aqueous solutions containing the product obtained by combining water with the various organosilicon compounds and the silicone emulsion. These aqueous solutions comply with various of the local, state and federal regulations regarding volatile organic content (VOC). Such regulations typically prohibit a volatile organic content for an architectural coating for example in excess of about four hundred grams per liter. In contrast, many coatings of the prior art containing solvent based alkoxysilanes liberate an alcohol which is a volatile organic compound. The volatile organic content (VOC) of such prior art solvent based coatings can be of the order of magnitude of 650–700 grams per liter.

Volatile Organic Content (VOC) has been defined as the amount of volatile organic compounds liberated from a coating as determined by ASTM D3690 and EPA Reference Method 24 which are standard industrial tests. Under the definition, a volatile organic compound is any compound which enters the atmosphere and photochemically reacts in the atmosphere with nitrogen oxides to reduce ozone. Reduction of VOC has been mandated in several states and regulations in California for example require less than four hundred grams of volatiles per liter of product to enter the atmosphere. This can be determined by baking 0.5–10.0 grams of a product in an oven at one hundred-ten degrees Centigrade for one hour. The amount of solids which remain is subtracted from the total of the ten grams which was tested. Calculations are based on the weight of the volatiles that have evaporated which is reported as grams per liter.

Examples illustrating the concept of the present invention are set forth below. The water repellency of the surfaces treated is shown in Tables I and II as "water exclusion". The procedures employed for the purpose of determining water exclusion are set forth immediately below.

TEST PROCEDURES

Standard 2×4 pine, redwood, and cedar were obtained from a local lumber supply, cut to six inches length, and allowed to equilibrate at room temperature in a 50% relative humidity atmosphere. The boards were treated by brushing on until saturated or soaking for three minutes in the water repellent solution. A control board was left untreated and kept in the 50% humidity room during the entire cure process. The treated boards were left to cure for one day in a laboratory atmosphere and placed in the 50% humidity room for six days to finish the cure and equilibrated to 50% humidity. After cure, all boards including the control were weighed and placed in room temperature water for 15 minutes, turned over and left another 15 minutes. After 30 minutes in water, all boards were weighed and the water uptake calculated. The water exclusion was (water uptake of control − water uptake of treated board ×100/(water uptake of control).

The Federal test method SS-W-110C was used to obtain percent water adsorption of each piece of grout and sandstone. The grout cubes used in the testing were 2"×2"×2" cubes made from mortar and sand. The standstone pieces were 1"×1"×4" made of Briar Hill Sandstone. An untreated control was included for comparison and to calculate water exclusion. Grout and standstone pieces were wire brushed and blown clean with high pressure air. The pieces were weighed and dried in an oven at 80° C. until a constant weight was reached. The pieces were weighed, placed in ¼" of water for 24 hours, weighed again, and dried in an 80° C. oven until a constant weight was reached. The pieces were treated with the water repellent by soaking for 10 seconds. The pieces were weighed before and after treatment. The pieces were allowed to cure 48 hours before being returned to ¼" of water to soak for 72 hours. After soaking, the pieces were weighed again. Water uptake, percent water adsorption (water uptake×100/weight of piece dry), and % water exclusion were calculated.

A series of experiments were performed to determine water repellent properties. Three types of substrates were treated: a neutral cementitious sandstone; a basic cementitious grout; and cellulosic material wood.

EXAMPLE I

There was prepared a dimer of two methoxy silanes which were methyltrimethoxysilane (I) and N-(2-aminoethyl)-3-aminopropyltrimethoxysilane (II). The dimer was produced by combining 2.7 moles of (I) and 1.4 moles of (II) and adding 1.8 moles of water slowly to the silane combination. This partial hydrolysis product was stripped of methanol under vacuum along with a small amount of I. The dimer which resulted contained about 60–65% by weight of active material and was stable upon dilution in water to between 0.5% to 20% by weight active. The concentrations tested were 2.5%, 5%, 10%, and 15%. The results in Table I were obtained on sandstone and wood. The water exclusion was calculated as (water pickup of untreated substrate − water pickup of treated substrate)×100/(water pickup of untreated substrate).

TABLE I

| Substrate | % Active | % Water Exclusion |
|---|---|---|
| Sandstone | 2.5 | 89 |
|  | 5.0 | 90 |
|  | 10.0 | 88 |
| 6" Pine 2 × 4 | 2.5 | 19 |
|  | 5.0 | 26 |
|  | 10.0 | 38 |
|  | 15.0 | 54 |

EXAMPLE II

The ratios in Example I of the silanes methyltrimethoxsilane (I) and N-(2-aminoethyl)aminopropyltrimethoxysilane (II) were changed to one mole of each silane with 1.29 moles of water to reduce the amount of silane (I) stripped off with methanol. This material will be referred to hereinafter as the "Dimer". The water exclusion improved on pine and was similar as Example I on sandstone as shown in Table II.

TABLE II

| Substrate | % Active | % Water Exclusion |
|---|---|---|
| Sandstone | 2.5 | 90 |
|  | 5.0 | 87 |
|  | 10.0 | 88 |
| 6" Pine 2 × 4 | 2.5 | 65 |
|  | 5.0 | 70 |
|  | 10.0 | 70 |

In order to demonstrate the synergy which exists when employing the compositions of the present invention, a test was employed in order to determine the dimensional stability of a treated substrate. The test was an "Anti-Swelling Effectiveness" test in accordance with the Federal Specification TT-W-572B and ASTM Standard Test Method D4446. The test specification calls for the use of sapwood ponderosa pine test slats which are straight grained and kiln dried. The boards from which the test slats are cut are required to be equilibrated in a conditioning chamber to fifty percent relative humidity and seventy degrees Fahrenheit until a constant weight is achieved. The test pieces are required to be treated and along with an untreated control test piece returned to the conditioning chamber for six days until the test pieces have reached a constant weight.

A "Swellometer" described in ASTM Standard Test Method D4446 is used to measure the swell of the test pieces in the tangential direction. The test pieces including the untreated control test piece are weighed. The test pieces are placed in the "Swellometer" test tank and submersed in water for thirty minutes. The dial reading of the "Swellometer" gage provides a visual recording of the amount of swell measured by the device for each test piece. Each test piece is removed from the device and weighed. Water exclusion is calculated as (water adsorbed of treated test piece−water adsorbed of control test piece)×100/water adsorbed of control test piece. Water repellency is calculated as (swell of treated test piece−swell of control test piece)×100/swell of control test piece. The "Swellometer" test for water repellency actually measures the dimensional stability of the test piece. Since the wood of the test piece will swell due to water adsorption, the results obtained for water exclusion and water repellency will differ.

EXAMPLE III

Four compositions were prepared for the purpose of testing each formulation in accordance with the foregoing "Swellometer" procedure. The first formulation employed contained three parts by weight of the "Dimer" of Example II and ninety-seven parts by weight of water. This formulation corresponds to the materials of U.S. Pat. No. 5,051,129. The second formulation employed contained four parts by weight of elastomeric silicone emulsion and ninety-six parts by weight of water. This formulation corresponds to the materials of U.S. Pat. No. 4,273,813. The third formulation employed contained three parts by weight of the "Dimer" of Example II; 0.5 parts by weight of elastomeric silicone emulsion; and 96.5 parts by weight of water. This formulation corresponds to the treatment composition of the present invention. The fourth formulation employed was a commercial water sealing material available from Thompson & Formsby Incorporated, Memphis, Tenn. under the trademark THOMPSON'S ® WATER SEAL ®. The results of the "Swellometer" test for wood wafer test pieces treated with each of these four formulations is shown below in Table III.

TABLE III

| Formulation | Water Exclusion | Water Repellency |
|---|---|---|
| "Dimer" | 29 | 8 |
| Emulsion | 65 | 25 |
| "Dimer" + Emulsion | 81 | 10 |
| THOMPSON'S ® | 77 | 45 |

The synergy of the composition of the present invention should be apparent from a consideration of Table III. Thus, the "Dimer"+Emulsion formulation exhibited a water exclusion of eighty-one which exceeds the water exclusion of either the "Dimer" or the Emulsion when employed individually. The "Dimer"+Emulsion formulation also outperformed the commercial water sealing material as to water exclusion. The higher value of the commercial water sealing material as to water repellency is due to the fact that the commercial water sealing material is organic solvent based rather than an aqueous based product as are the other organosilicon containing formulations.

The compositions of this invention may be formulated as water solutions by combining together from (i) zero to fifty percent by weight of an alkyltrialkoxysilane and a water soluble silane coupling agent or hydrolysis product thereof which are combined in a ratio of from 0.5:1.0 to 3.0:1.0; (ii) zero to fifty percent by weight of the silicone emulsionl and (iii) the balance water.

It will be apparent from the foregoing that many other variations and modifications may be made in the compounds, compositions and methods described herein without departing substantially from the essential features and concepts of the present invention. Accordingly, it should be clearly understood that the forms of the invention described herein are exemplary only and are not intended as limitations on the scope of the present invention as defined in the appended claims.

That which is claimed is:

1. A composition comprising a solution obtained by combining (i) water; (ii) an alkyltrialkoxysilane selected from the group consisting of $C_1$ to $C_6$ alkyl groups on silicon and blends of alkyltrialkoxysilanes with $C_1$ to $C_6$ alkyl groups on silicon; (iii) a water soluble silane coupling agent or hydrolysis product thereof; and (iv) an aqueous silicone emulsion of an anionically stabilized hydroxyl endblocked polydiorganosiloxane, amorphous silica and an organic tin salt.

2. The composition according to claim 1 in which the emulsion has a pH of at least nine and a solids content of 35-75 percent by weight.

3. The composition according to claim 1 in which the emulsion includes 2-50 parts by weight of silica based on one hundred parts by weight of hydroxyl endblocked polydiorganosiloxane.

4. The composition according to claim 1 in which the emulsion includes 0.1-1.5 parts by weight of organic tin salt based on one hundred parts by weight of hydroxyl endblocked polydiorganosiloxane.

5. The composition according to claim 1 in which the alkyltrialkoxysilane is selected from the group consisting of methyltrimethoxysilane, ethyltrimethoxysilane, propyltrimethoxysilane, isopropyltrimethoxysilane, butyltrimethoxysilane, isobutyltrimethoxysilane pentyltrimethoxysilane and hexyltrimethoxysilane.

6. The composition according to claim 5 in which the alkyltrialkoxysilane is methyltrimethoxysilane.

7. The composition according to claim 5 in which the alkyltrialkoxysilane is isobutyltrimethoxysilane.

8. The composition according to claim 1 in which the silane coupling agent has the formula $X_3Si(CH_2)_nY$ in which n has a value of zero to three; X is a hydrolyzable group on silicon; and Y is a reactive organofunctional group.

9. The composition according to claim 8 in which the silane coupling agent is selected from the group consisting of N-(2-aminoethyl)-3-aminopropyltrimethoxysilane, N-(aminoethylaminomethyl)phenyltrimethoxysilane, N-(2-aminoethyl)-3-aminopropyltris(2-ethylhexoxy)silane, 3-aminopropyltrimethoxysilane, trimethoxysilylpropyldiethylenetriamine, and bis(2-hydroxyethyl)-3-aminopropyltrimethoxysilane.

10. The composition according to claim 9 in which the silane coupling agent is N-(2-aminoethyl)-3-aminopropyltrimethoxysilane.

11. A method of treating a surface in order to exclude water penetration of the surface comprising applying to the surface a composition which is a solution obtained by combining (i) water; (ii) an alkyltrialkoxysilane selected from the group consisting of $C_1$ to $C_6$ alkyl groups on silicon and blends of alkyltrialkoxysilanes with $C_1$ to $C_6$ alkyl groups on silicon; (iii) a water soluble silane coupling agent or hydrolysis product thereof; and (iv) an aqueous silicone emulsion of an anionically stabilized hydroxyl endblocked polydiorganosiloxane, amorphous silica and an organic tin salt.

12. The method according to claim 11 in which the emulsion has a pH of at least nine and a solids content of 35-75 percent by weight.

13. The method according to claim 11 in which the emulsion includes 2-50 parts by weight of silica based on one hundred parts by weight of hydroxyl endblocked polydiorganosiloxane.

14. The method according to claim 11 in which the emulsion includes 0.1-1.5 parts by weight of organic tin salt based on one hundred parts by weight of hydroxyl endblocked polydiorganosiloxane.

15. The method according to claim 11 in which the alkyltrialkoxysilane is selected from the group consisting of methyltrimethoxysilane, ethyltrimethoxysilane, propyltrimethoxysilane, isopropyltrimethoxysilane, butyltrimethoxysilane, isobutyltrimethoxysilane, pentyltrimethoxysilane and hexyltrimethoxysilane.

16. The method according to claim 15 in which the alkyltrialkoxysilane is methyltrimethoxysilane.

17. The method according to claim 15 in which the alkyltrialkoxysilane is isobutyltrimethoxysilane.

18. The method according to claim 11 in which the silane coupling agent has the formula $X_3Si(CH_2)_nY$ in which n has a value of zero to three; X is a hydrolyzable group on silicon; and Y is a reactive organofunctional group.

19. The method according to claim 18 in which the silane coupling agent is selected from the group consisting of N-(2-aminoethyl)-3-aminopropyltrimethoxysilane, N-(aminoethylaminomethyl)phenyltrimethoxysilane, N-(2-aminoethyl)-3-aminopropyltris(2-ethylhexoxy)silane, 3-aminopropyltrimethoxysilane, trimethoxysilylpropyldiethylenetriamine, and bis(2-hydroxyethyl)-3-aminopropyltrimethoxysilane.

20. The method according to claim 19 in which the silane coupling agent is N-(2-aminoethyl)-3-aminopropyltrimethoxysilane.

* * * * *